United States Patent
Yale

Patent Number: 5,879,587
Date of Patent: Mar. 9, 1999

[54] TERBIUM-ACTIVATED RARE EARTH OXYSULFIDE PHOSPHOR WITH ENHANCED GREEN:BLUE EMISSION RATIO

[75] Inventor: Ramon L. Yale, Ulster, Pa.

[73] Assignee: Osram Sylvania Inc., Danvers, Mass.

[21] Appl. No.: 936,456

[22] Filed: Sep. 24, 1997

[51] Int. Cl.$^6$ .................................................. C09K 11/84
[52] U.S. Cl. ................................................... 252/301.45
[58] Field of Search ...................................... 252/301.45

[56] References Cited

U.S. PATENT DOCUMENTS 3,904,546  9/1975  Mattis et al. ................. 252/301.4 S

FOREIGN PATENT DOCUMENTS 57-141482  9/1982  Japan .......................... 252/301.4 S
WO 85/04179  9/1985  WIPO .

Primary Examiner—Melissa Bonner
Attorney, Agent, or Firm—Robert F. Clark

[57] ABSTRACT

A terbium-activated rare earth oxysulfide phosphor with an enhanced green:blue emission ratio is disclosed. The phosphor includes a rare earth oxysulfide matrix of the nominal formula $M_{2-x}O_2S:xTb$, where M is lanthanum, gadolinium, yttrium, scandium, lutetium or their mixtures, and x is 0.001–0.2. Up to 1000 ppm of dysprosium is incorporated in the matrix to enhance the green:blue emission ratio of the phosphor. A method of enhancing the green:blue ratio is also disclosed.

5 Claims, 2 Drawing Sheets

TERBIUM-ACTIVATED RARE EARTH OXYSULFIDE PHOSPHOR WITH ENHANCED GREEN:BLUE EMISSION RATIO

BACKGROUND OF THE INVENTION

The present invention relates to rare earth oxysulfide particulate materials, and particularly relates to terbium-activated rare earth oxysulfide phosphors exhibiting an enhanced green:blue emission ratio as well as a method for producing such enhancement.

Rare earth oxysulfides have long been recognized in the art as valuable luminescent materials. These phosphors are in the form of a solid solution having a matrix of the rare earth oxysulfide compound with a small amount of an activator or dopant dispersed throughout the matrix. The activator normally is also a rare earth element.

Among such rare earth activated rare earth oxysulfides are the blue-green emitting terbium-activated rare earth oxysulfides having the nominal formula:

$$M_{2-x}O_2S: xTb \qquad (1)$$

where x is 0.001 to 0.2. The matrix rare earth metal element (designated by M in Formula 1) in these phosphors typically is lanthanum, gadolinium, yttrium, scandium, lutetium, or mixtures of these elements.

These phosphors are useful, e.g., in the field of x-ray intensifier screens. However, the spectral sensitivity of the x-ray film does not always precisely match the emission of the phosphor. Thus, it would be desirable to have the capability to adjust the green:blue emission ratio of the phosphor emission to tailor the phosphor emission to the spectral sensitivity of the x-ray film.

Accordingly, it is an object of the present invention to provide a terbium-activated rare earth oxysulfide phosphor which overcomes the disadvantages of the prior art.

It is another object of the invention to provide a terbium-activated rare earth oxysulfide phosphor in which the green:blue emission ratio of the phosphor emission is enhanced.

It is yet another object of the invention to provide a terbium-activated rare earth oxysulfide phosphor in which the phosphor emission can be tailored to match the spectral sensitivity of a particular x-ray film.

It is still another object of the invention to provide a method of enhancing the green:blue emission ratio of a terbium-activated rare earth oxysulfide phosphor.

SUMMARY OF THE INVENTION

In accordance with these objects, in one aspect the invention is a terbium-activated rare earth oxysulfide phosphor with an enhanced green:blue emission ratio. The phosphor includes a rare earth oxysulfide matrix of the nominal formula $M_{2-x}O_2S:xTb$, where M is at least one rare earth element selected from lanthanum, gadolinium, yttrium, scandium, and lutetium, and x is 0.001–0.2. An amount of not more than 1000 ppm of dysprosium is incorporated in the matrix.

In another aspect, the invention is a method of enhancing the green:blue emission ratio of a terbium-activated rare earth oxysulfide phosphor including a rare earth oxysulfide matrix of the formula $M_{2-x}O_2S:xTb$, where M is at least one rare earth element selected from lanthanum, gadolinium, yttrium, scandium, lutetium, and mixtures thereof, and x is 0.001–0.2. The method includes incorporating an amount of dysprosium of not more than 1000 ppm into the matrix. Preferably, the dysprosium is added to the starting formulation at a weight selected to achieve the desired amount.

BRIEF DESCRIPTION OF THE DRAWINGS

For a better understanding of the present invention, together with other objects, features, advantages, and capabilities thereof, reference is made to the following Description and appended Claims, together with the Drawings in which:

DETAILED DESCRIPTION OF THE PREFERRED EMBODIMENTS

Figure 1:
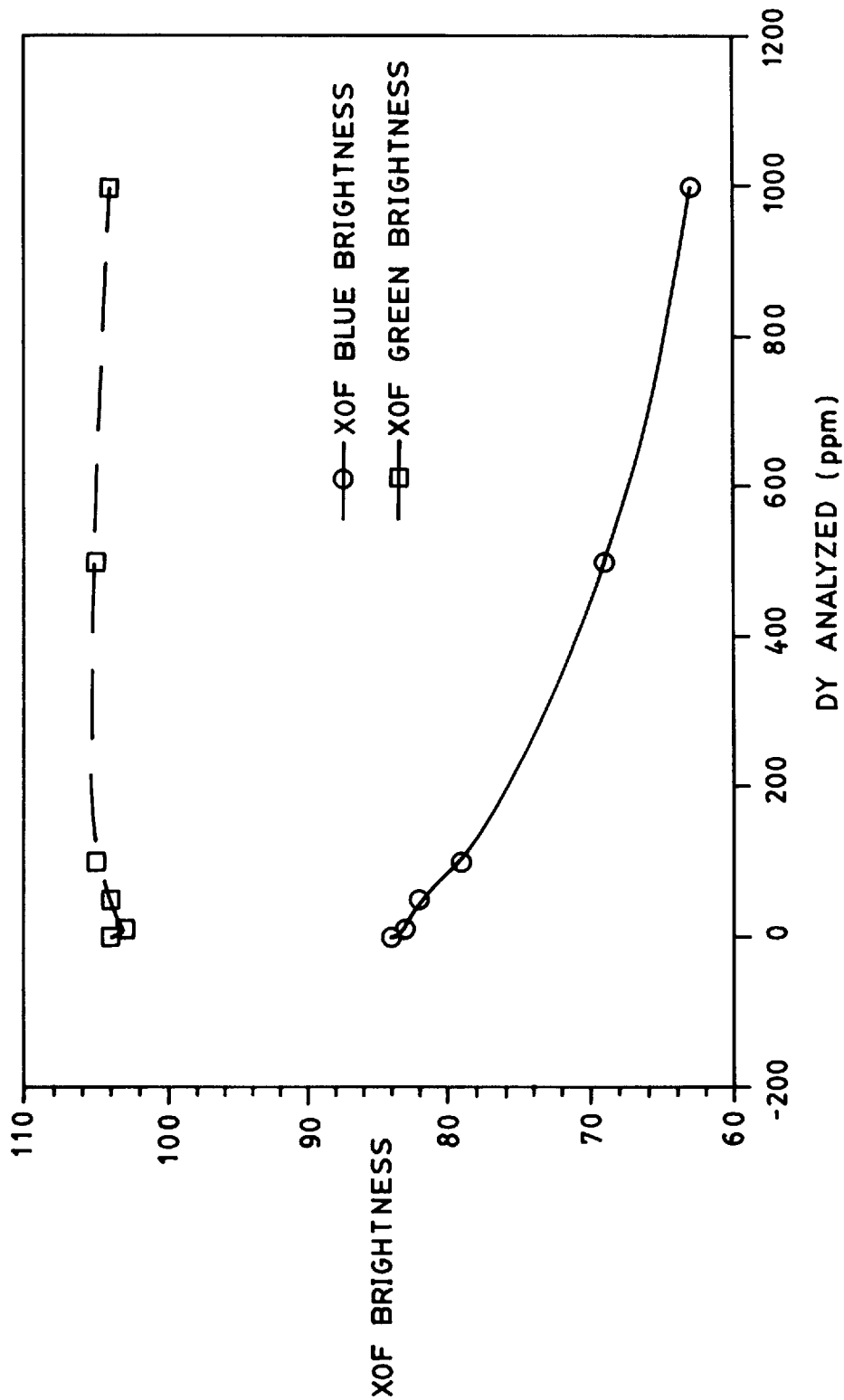
FIG. 1 is a graphical representation of the green and blue emissions of terbium-activated rare earth phosphors containing varying amounts of dysprosium in accordance with one embodiment of the present invention.

As used herein, the term "phosphor" refers to a material capable of exhibiting luminescence when subjected to proper excitation. The phosphors described herein are terbium-activated rare earth oxysulfide phosphors. Also as used herein, the term "rare earth" refers to any of scandium, yttrium, lanthanum, cerium, praseodymium, neodymium, samarium, europium, gadolinium, terbium, dysprosium, holmium, erbium, thulium, ytterbium, lutetium, and mixtures thereof. In the phosphors described herein, however, the metal component of the phosphor matrix (M in Formula 1) is limited to lanthanum, gadolinium, yttrium, scandium, lutetium and mixtures thereof. The preferred matrix metal component is gadolinium. The term "enhanced" as used herein is intended to mean "increased" or "made greater."

It has been found that adding a minute amount of dysprosium to terbium-activated rare earth oxysulfide phosphors represented by the nominal formula $M_{2-x}O_2S:xTb$ (designated above as Formula 1) where x is 0.001 to 0.2, during their synthesis can significantly alter the green:blue emission ratio of the phosphor. Adding an amount of dysprosium of no more than 1000 ppm (parts per million) to these phosphors reduces the blue emission as measured by the x-ray optical fluorescence (XOF), while the green emission remains approximately constant. Amounts between about 10 and 1000 ppm are preferred, since the affect of amounts less than 10 ppm is too slight to be of value in most applications, and the ratio appears to reach a maximum at an amount of about 1000 ppm. Most preferred are amounts of dysprosium between about 50 and 1000 pm.

The dysprosium is added to the starting formulation in the form of a powdered dysprosium compound which will leave no residue after firing and washing of the phosphor. Alternatively, the dysprosium compound is selected to leave a residue which will not significantly affect the other properties of the finished phosphor. The dysprosium compound is added to the starting formulation for the phosphor and thoroughly blended by any means known in the art for blending such phosphors. The weight percent of dysprosium required to produce the desired alteration of the green:blue emission ratio of any particular terbium-activated rare earth phosphor may be empirically determined. The powders are then fired in known manner, e.g., at 1000°–1400° C., to produce the phosphor having the desired degree of alteration in its green:blue emission ratio.

The following Example is presented to enable those skilled in the art to more clearly understand and practice the present invention. The Example should not be considered as a limitation upon the scope of the present invention, but merely as being illustrative and representative thereof.

EXAMPLE

The starting powder formulation shown in Table I was combined and thoroughly blended by mixing with 250 cc of ⅜" alumina bead in a 1 liter plastic bottle (a Nalgene bottle) and roll milling the mixture in the bottle for 1 hour at 80 bottle-rpm. Similar samples were prepared by the same method using amounts of $Dy_2O_3$ selected to produce the proportions of dysprosium shown in FIGS. 1 and 2. A control sample including no dysprosium was also similarly prepared.

TABLE I

| | |
|---|---|
| $Gd_2O_3$ | 361.00 g |
| $Tb_4O_7$ | 1.122 g |
| $Na_2CO_3$ · anhydrous | 106.00 g |
| Sulfur | 96.18 g |
| $Na_2HPO_4$ | 28.40 g |
| $Dy_2O_3$ | 0.4162 g (for 1000 ppm) |

The powder mixtures were placed in alumina crucibles, covered, and fired in a gas fired or electric furnace for 2 hours at about 1135° C. to produce the phosphor samples. The samples were cooled and washed with de-ionized water to remove any soluble by-products. The samples were dried for 2.0–4.0 hours at 100°–150° C., then heated in a crucible or tray in ambient air for 1–3 hours at 525°–590° C.

The samples were then sieved and analyzed to determine the ppm dysprosium in each, and the XOF brightness of each phosphor was measured. The green and blue emissions and the green:blue emission ratio of the samples are shown in FIGS. 1 and 2 respectively.

Figure 2:
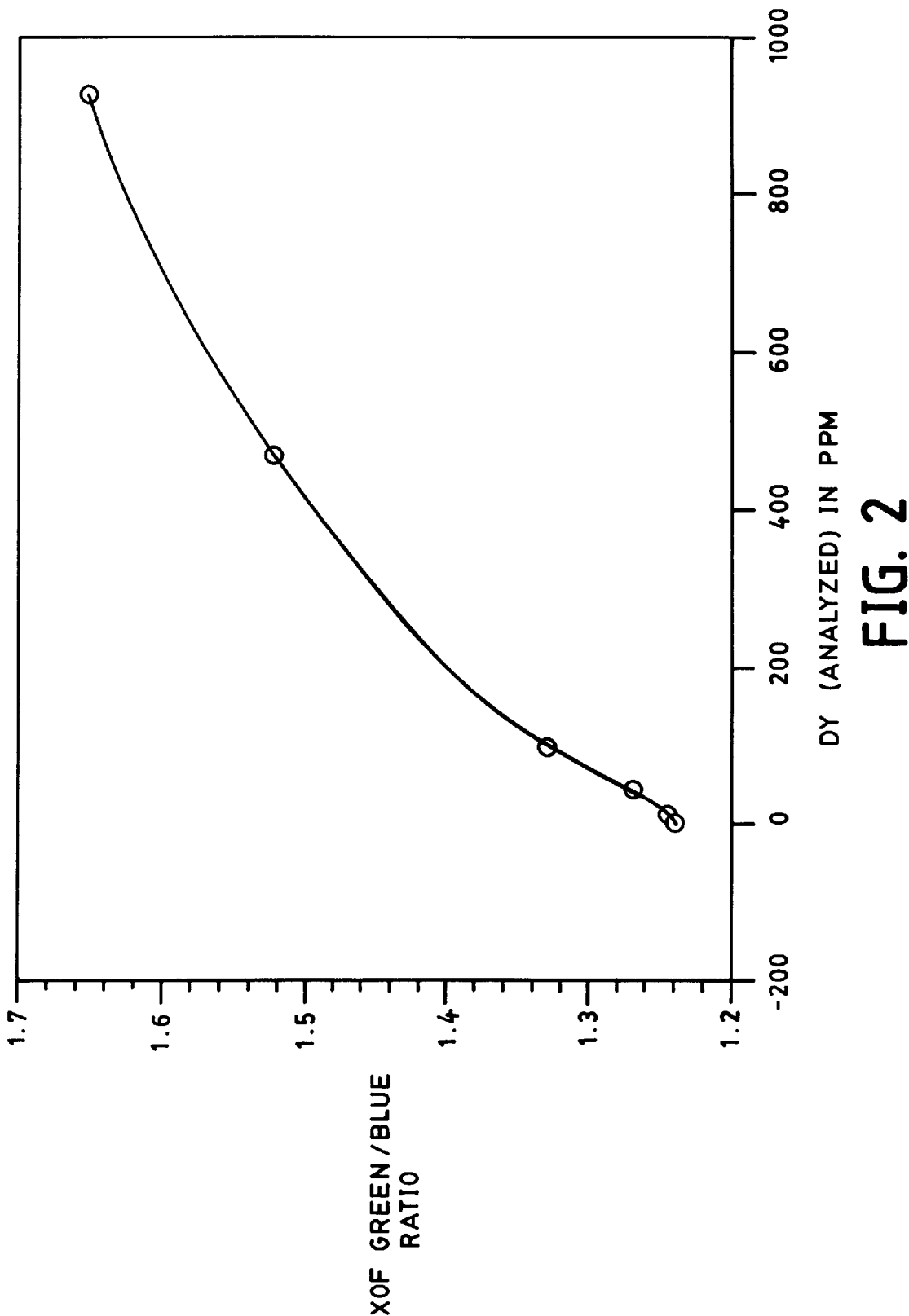
FIG. 2 is a graphical representation of the green:blue emission ratios of the phosphors of FIG. 1.

As shown in FIG. 1, the brightness of the blue emission decreases with increasing amounts of dysprosium, while the brightness of the green emission varies very little. This disparity produces an increase in the green:blue emission ratio with increasing dysprosium addition, as shown in FIG. 2, up to a level of about 1000 ppm dysprosium. Thus, the green:blue emission ratio may be tailored, e.g., to suit the spectral sensitivity of a particular x-ray film.

The invention described herein presents to the art novel, improved terbium-activated rare earth oxysulfide phosphors in which the green:blue emission ratio may be enhanced.

While there has been shown and described what are at present considered the preferred embodiments of the invention, it will be apparent to those skilled in the art that modifications and changes can be made therein without departing from the scope of the present invention as defined by the appended Claims.

I claim:

1. A method of enhancing the green:blue emission ratio of a terbium-activated rare earth oxysulfide phosphor comprising a rare earth oxysulfide matrix of the formula:

$$M_{2-x}O_2S: xTb$$

wherein M is at least one rare earth element selected from the group consisting of lanthanum, gadolinium, yttrium, scandium, and lutetium, and x is 0.001–0.2, said method comprising:

incorporating an amount of dysprosium of not more than 1000 ppm into said matrix.

2. A method in accordance with claim 1 wherein said amount is between about 10 ppm and 1000 ppm.

3. A method in accordance with claim 2 wherein said amount is between about 50 ppm and 1000 ppm.

4. A method in accordance with claim 1 wherein M is gadolinium.

5. A method in accordance with claim 1 wherein said dysprosium is added to the starting formulation at a weight selected to achieve said amount.

\* \* \* \* \*